United States Patent Office 3,415,112
Patented Dec. 10, 1968

3,415,112
WATER-FREE PENETRANT INSPECTION
PROCESS AND MATERIALS
James R. Alburger, 5007 Hillard Ave.,
La Canada, Calif. 91011
No Drawing. Filed May 3, 1965, Ser. No. 452,861
6 Claims. (Cl. 73—104)

ABSTRACT OF THE DISCLOSURE

A water-free penetrant process, and an applicable family of process materials, which utilizes a dyed liquid glycol penetrant, a solvent coupler which acts to render the surface penetrant on a test part rinsable with a mineral thinner, and a mineral solvent wash liquid which acts to rinse off surface penetrant and at the same time renders flaw entrapments of the glycol penetrant insoluble and "frozen" in position.

This invention relates to a process and a family of process materials suitable for use in the detection of surface flaws in critical machine parts such as jet engine turbine blades, bearings, and structural members, and in electronic circuitry and in associated components. More particularly, it relates to a process and a family of process materials which are chemically "inverted" with respect to conventional post-emulsifier penetrant processes.

In the past, penetrant inspection processes have been employed to detect the presence of potentially dangerous surface flaws in many kinds of parts. For example, in a jet engine turbine blade which undergoes high levels of stress in operation, a sub-microscopic surface flaw, such as a stress crack or an inter-crystalline corrosion crack, can cause a failure in the blade, thus resulting in a catastrophic engine failure. The penetrant inspection process has been developed to a high degree of efficiency in detection of such surface discontinuities, and the most efficient form of this process is known as the oil-phase post-emulsifier process, which is usually referred to as the P/E process.

In the oil-phase P/E process, a part being inspected is immersed in an oily, water insoluble penetrant which contains a visible color or fluorescent tracer dye. The penetrant enters any surface flaws which exist, thus forming flaw entrapments of the penetrant. An emulsifier is then applied to the part, with the result that the residual film of oily penetrant on the surface of the part is rendered "emulsifiable" or soluble in water. However, the penetrant entrapments which have not been emulsified remain insoluble in water. The part is washed in water to remove the emulsified surface penetrant, and the part is then inspected for the presence of visible dye or fluorescent indications, as the case may be. For this purpose, a developer is sometimes used to augment the visibility of the indications by absorbing the penetrant entrapments onto developer powder particles, or otherwise building up the apparent film thickness of the entrapments to improve their visibility.

The above-described oil-phase P/E penetrant inspection process has the best flaw detection efficiency of any penetrant-type inspection method which heretofore has been known. However, it suffers from certain drawbacks which make it undesirable for use in certain critical applications. For example, the oily penetrant has a characteristic mobility which is highly desirable in most cases, but in certain kinds of flaws, this mobility feature causes ultra-small penetrant entrapments to migrate and thin out to the point where their visibility becomes lost. Also, in cases where inspection is to be carried out on electronic circuit boards, it is often found that the boards or various delicate electronic components thereof cannot tolerate any contact with water. Furthermore, the oily penetrant tracers are incompatible with soldering fluxes and cannot be conveniently used for the inspection of defective solder joints.

Although solvent removers can be used in place of water for cleaning and removing oil-phase penetrants, the use of such removers does not provide a desired high level of flaw detection efficiency. The penetrant inspection art has not provided, up to the present time, any families of penetrant inspection materials which yield a "post-emulsifiable" function with the attendant high level of flaw detection performance, and yet which do not employ water as one of the process materials.

It has been found that it is possible to provide a family of penetrant inspection materials which does not include water, and which has a flaw detection efficiency equal to or greater than any conventional oil-phase P/E process. Moreover, it has been found that it is possible to provide a waterless penetrant inspection process which is suitable for detecting flaws in soldered and spot-welded electronic circuitry, cracks in electronic parts such as resistors, capacitors, and component housing, porosities in plated films, anodic films, and ceramics, micro-cracks and porosities in welded, brazed, and soldered joints, and defects and excessive porosity in heat resistant films.

The principal object of the invention, therefore, is to provide a penetrant inspection process which does not employ water as one of the process materials.

Another object of the invention is to provide a family of penetrant inspection process materials which yields a high level of flaw detection efficiency.

Still another object of the invention is to provide a penetrant inspection process which is chemically "inverted" with respect to conventional oil-phase penetrant process.

A further object of the invention is to provide a penetrant flaw detection process which can be employed for inspecting delicate electronic circuit boards and components.

A still further object of the invention is to provide a flaw tracer material which is compatible with or which can be used with soldering fluxes.

In order to properly understand the advantageous features of the present invention, it is first necessary to understand the chemical character and behaviour of the conventional oil-phase P/E penetrant process. In this conventional process, an oily water-insoluble penetrant is rendered soluble, or emulsifiable, in a final bath of water. Hence, the sequence of process steps is as follows:

(1) Oily, water-insoluble penetrant (penetration step).
(2) Emulsifier or oil-water coupler (emulsification step).
(3) Water wash step.

In the present invention, the process steps are substantially an "inverted" sequence as compared with the above-stated conventional process, being as follows:

(1) Non-oily, oil-insoluble penetrant (penetration step).
(2) Penetrant-oil coupler (emulsification step).
(3) Oily wash or rinse step.

The three essential constituents of a "post-emulsifier" type penetrant process can be provided in an "inverted" penetrant system by use of a glycol material for the penetrant, a glycol-ether or an alcohol for the penetrant-oil coupler, and a mineral thinner for the final wash or rinse. The selection and usage of these process materials may be carried out as follows:

First, any normally liquid glycol may be employed as a penetrant liquid, such materials being characterized by insolubility in mineral thinners in much the same way that oily penetrants are insoluble in water. Although numerous glycols exist, only a few are normally liquid at temperatures which are near to or slightly above room temperature, and, of course, only such normally liquid glycols are suitable or practical for use as a penetrant liquid. It should be noted, however, that certain glycols notably certain polyethylene glycols, which are waxy solids at room temperature become liquidified at using temperatures encountered in soldering operations, for example. Therefore, such glycols would provide suitable flow penetrating and detecting capabilities under such use conditions, and such glycols are considered to be normally liquid materials for the purpose of this invention.

Inasmuch as all polyhydric alcohols and polymeric glycols exhibit the same solvent characteristics with respect to the other process materials of this invention, any normally liquid glycol may be used as the penetrant liquid carrier, and the invention is thus not limited in any way to the selection of specific glycol materials except that the glycol or glycol mixture must be normally liquid at the temperature employed in the penetrant step in the practice and use of the invention. Typical glycol materials are:

| | |
|---|---|
| Ethylene glycol | Dipropylene glycol |
| Diethlene glycol | Ethylhexylene glycol |
| Triethylene glycol | Glycerin |
| Propylene glycol | Polyethylene glycols |

Secondly, any normally liquid glycol-ether or alcohol may be employed as a coupler to carry the glycol penetrant into solution in the final mineral thinner rinse, such materials being characterized by a solubility in or compatibility with both glycols and mineral fractions. This behaviour is very similar, in function, to the ability of a conventional emulsifier to mutually solubilize oily materials and water. Although all glycol ethers and all alcohols will perform the required function of coupling the glycol penetrant into solution with the mineral solvent rinse, some are more effective than others in that they have different solubility capabilities. However, any such differences in performance are merely a matter of degree, and any normally liquid glycol-ether or alcohol which is liquid at the using temperature in the process, can be used in the process step of penetrant-mineral thinner coupler. Typical glycol-ether and alcohol materials are:

| | |
|---|---|
| Ethylene glycol monomethyl ether. | Methanol. |
| Ethylene glycol monoethyl ether. | Ethanol. |
| Ethylene glycol monobutyl ether. | Isopropanol. |
| Ethylene glycol ethylbutyl ether. | Butanol. |
| Ethylene glycol monophenyl ether. | Amyl alcohol. |
| Ethylene glycol monobenzyl ether. | Iso decanol. |
| Diethylene glycol monomethyl ether. | Undecanol. |
| Diethylene glycol monoethyl ether. | Diacetone alcohol. |
| Diethylene glycol monobutyl ether. | Hexanol. |

Thirdly, any mineral thinner may be employed as the final wash or rinse step in the process. In general, aliphatic mineral solvents are best for the purpose of the invention, as will be described; however, aromatic mineral thinners and even powerful mineral solvents such a dimethyl naphthalene may be utilized. Here again, the differences in performance capabilities which are found in different mineral solvents are merely a matter of degree, being mainly a function of the solvency power or "kauri-butanol" value of the mineral solvent. Accordingly, the mineral solvent rinse may consist of any normally liquid petroleum fraction. Although a preferred form of the mineral solvent is one which is relatively volatile and which has a relatively low viscosity, nonvolatile, highly viscous oils are adaptable for the purpose of the invention. Since glycols as a group are incompatible with mineral solvents as a group, and will not dissolve therein without the aid of some kind of solvent coupler or surfactant coupler, any normally liquid mineral solvent may be used for the purpose of this invention.

It will be seen, therefore, that the three essential process materials of this invention have performance features which are essentially equivalent to the features of conventional P/E process materials. The usage of these materials in a penetrant inspection process may follow practical procedure steps as follows:

Step 1.—A penetrant material is prepared using a glycol vehicle which is liquid at the normal using temperature. At least one indicator dye is dissolved in the glycol penetrant liquid.

Step 2.—The thus-prepared dye glycol penetrant is applied to a surface which is to be inspected for surface cracks or other discontinuities.

Step 3.—A solvent coupler consisting essentially of a normally liquid glycol-ether or an alcohol is applied to the surface so as to bring it in contact with the glycol penetrant remaining on the surface. A suitable dwell time is allowed to permit the glycol-ether or alcohol solvent coupler to blend with the residual glycol penetrant on the surface.

Step 4.—The surface is rinsed with a mineral solvent so as to flush away the mixture of glycol and glycol-ether or alcohol materials on the surface.

Step 5.—Residual entrapments of dyed glycol penetrant remaining in surface flaws are detected by visual inspection. This inspection step may be augmented by use of a developer, a suitable developer being of the type described and claimed in my Patent No. 3,184,596.

Following the step of washing or rinsing in accordance with this invention, subsequent steps of drying, development, and inspection may be carried out in various ways. However, such process steps are not germane to the invention insofar as the scope of this invention is limited to the formation of penetrant entrapments which can later be observed by appropriate inspection methods.

The following examples will illustrate the preparation and usage of the essential process materials of the invention:

Example 1.—In its simplest form, a glycol penetrant may be prepared as set forth in this example. Mix the following ingredients to form a thin slurry:

Indicator dye, Color Index Fluorescent Brightening
   Agent No. 46 _____lb__ 1
Color forming indicator dye, Color Index Acid Yellow
   No. 7 _____grams__ 40
Triethylene glycol to make 1 gallon.

Heat the mixture to about 140° F. for about ten minutes until the indicator dyes dissolve completely. When cool, the dye solution provides a high sensitiviy fluorescent inspection penetrant capable of revealing microflaws having dimensions on the order of 85 millimicrons.

In the foregoing example, the concentration of the dye may be reduced, thereby providing a reduced flaw detection sensitivity, or a different dye may be employed, such as Rhodamine B, Color Index Basic Violet No. 10, which provides an intense red color in the indications.

Example 2.—A complete penetrant process may be performed in accordance with this example. The penetrant liquid which was prepared in accordance with Example No. 1 is applied to a surface to be inspected for small cracks, and the excess liquid is allowed to drain off the surface. The surface is then treated with a solvent coupler consisting essentially of ethylene glycol monobutyl ether. The surface is then washed with a solvent rinse consisting essentially of a mineral solvent fraction having a boiling range substantially equivalent to that of kerosene. The surface is then inspected under ultraviolet light for the presence of any residual entrapments of dyed penetrant.

In the foregoing example, substitutions may be made in the glycol, using ethylene glycol, or proylene glycol, for example. The indicator dye employed may be substituted with any one of a multitude of suitable dyes which are soluble in the glycol penetrant vehicle. Also, a substitution may be made in the solvent coupler, replacing the ethylene glycol monobutyl ether with diethylene glycol monobutyl ether or isopropanol, for example. Finally, a substitution may be made in the mineral solvent rinse, replacing the kerosene-type solvent with any one of a variety of mineral solvent fractions such as various naphthas, or aromatic fractions, or materials such as xylene, dimethyl naphthalene, benzene, or similar materials.

Modifications may be made in the solvent coupler for the purpose of slowing down its solvent action on the glycol penetrant. Such modifications may include the addition of a proportion of mineral solvent such as kerosene to the glycol-ether or alcohol solvent coupler. Other special purpose additives might also be included in the solvent coupler, as, for example, an oil soluble surfactant material which would act to augment the coupling effect between the glycol penetrant and the mineral solvent wash liquid. In all cases, though, the essential ingredient in the solvent coupler is the glycol-ether or alcohol material, even though it may be present in a minor proportion by volume.

Since the glycol penetrant is insoluble in the mineral solvent wash liquid, any penetrant entrapments will tend to be "frozen" in the flaws during the washing step in the process. Thus, the so-called "flaw entrapment stability" of the process is very high and the process is capable of providing high levels of flaw detection sensitivity performance.

The mineral solvent wash liquid has a dual function. First, it acts to rinse away surface penetrant which has been rendered more or less soluble by the action of the solvent coupler. Second, it acts to "freeze" residual entrapments of the glycol penetrant in any surface flaws which may be present. It is, of course, obvious that the mineral solvent wash liquid might contain adulterants or supplemental ingredients which may tend to alter the degree of mutual solubility with the glycol penetrant. However, it is the intent and purpose of this mineral solvent wash liquid that it be relatively nonsolvent for the glycol penetrant such that the solvent action of the solvent coupler on the glycol penetrant is effectively quenched or retarded upon application of the mineral solvent liquid.

Returning now to the penetrant step of the invention, and the glycol penetrant which is employed, at least one indicator dye is dissolved in the glycol penetrant liquid for the purpose of providing visible color or fluorescent indications. Many dyes are available for use as indicators, and these are well known to the penetrant art. The selection of a suitable indicator dye and the concentration at which it is employed is a matter of preference as to the desired visible color fluorescent effect and the so-called flaw detection sensitivity. These factors are not germane to the invention, and any dye which is soluble in glycols may be used. It so happens that a large majority of useful indicator dyes, both visible color and fluorescent, are soluble in glycols. Many different dyes may be used for the purpose of providing a visible color or fluorescent effect in the glycol carrier, and the selection of an appropriate dye is not an essential element of this invention, even though certain preferred dye materials may be listed or included in the formulas given as examples. Some dyes are, of course, preferred over others because of color, fluorescent brightness, solubility characteristics, or economic features. However, there are many dyes to choose from, and the dye characteristics have substantially no bearing on the performance of the process materials of the invention in their penetration, coupling, and washing behaviour.

The glycol penetrant of the invention may provide a dual function if desired. For example, glycols are able to dissolve certain chemical ingredients which are useful as soldering fluxes. Hence, if such ingredients are included in the penetrant, the material becomes a soldering flux as well as an inspection penetrant. To illustrate such a dual function, a soldering flux may be prepared in accordance with the following example:

Example 3.—Mix the following ingredients and heat to about 140° to dissolve:

| | |
|---|---|
| Polyethylene glycol (M.W.=200) _____pint__ | 1 |
| Glutamic acid hydrochloride _____grams__ | 33 |
| Urea _____do____ | 19 |
| Indicator dye, color index fluorescent brightening agent No. 46_____grams__ | 27 |
| Indicator dye, color index fluorescent brightening agent No. 75 _____grams__ | 3.5 |

The mixture of the foregoing example provides a good soldering flux, and serves also as a penetrant which is capable of revealing defective solder connections or so-called "cold" solder joints, and other defects related to the soldered connections made in the presence of the solder flux. In use, the material is first used in a solder flux, and immediately after such usage, an inspection process is carried out utilizing the fluorescent flaw tracing function of the material to detect imperfections in the soldered joints.

Again, in this example, any desired indicator dye can be used, and the concentration of the dye may be selected so as to provide a desired sensitivity capability. The soldering flux ingredients given in this example happen to be those which are well known in a commercially practical flux formulation, and which are normally employed in water solution. Although these flux ingredients provide a satisfactory result, they are by no means the only materials which can be used for this purpose, and the formulation of Example 3 is given merely to illustrate the fact that the basic glycol penetrant may be used in conjunction with a variety of materials so as to provide special performance features in addition to the inspection penetrant function.

After using the formulation of Example 3 as a solder flux, the various process steps as given in Example 2 are carried out, whereupon any defects in the soldered joints are seen as bright fluorescent indications.

It will be seen from the foregoing specification that I have devised a new and novel process of penetrant inspection for the detection of surface flaws in materials.

I claim:

1. A water-free dye-indicating process for detecting surface flaws comprising the steps of applying a flaw-penetrating liquid tracer to a surface, applying a solvent coupler to said surface, and applying a liquid rinse to said surface, said flaw-penetrating liquid tracer consisting of a glycol carrier liquid containing at least one indicator dye, said solvent coupler consisting essentially of a normally liquid solvent of the group including glycol-ethers and alcohols, and said liquid rinse consisting essentially of a mineral thinner.

2. A method of inspecting surfaces for cracks and flaws employing method steps as follows:

Step 1.—Applying to a surface being tested, a flaw-penetrating glycol penetrant containing at least one indicator dye.

Step 2.—Removing excess penetrant from said surface.

Step 3.—Applying to said surface, a solvent coupler consisting essentially of a normally liquid solvent selected from the group consisting of glycol-ethers and alcohols, and allowing a dwell time sufficient to permit said solvent coupler to blend with the residual film of liquid glycol penetrant remaining on said surface.

Step 4.—Draining said solvent coupler from said surface.

Step 5.—Applying to said surface, a mineral thinner rinse and flushing away the blended mixture of said liquid glycol penetrant and said solvent coupler; and Step 6.—Determining the presence of flaw entrapments of said dyed liquid glycol penetrant.

3. A method in accordance with claim 2 in which said penetrant is at least one member of the group consisting of Ethylene glycol
Diethylene glycol
Triethylene glycol
Propylene glycol
Dipropylene glycol
Polyethylene glycol having a molecule weight less than approximately 1000.

4. A method in accordance with claim 2 in which said solvent coupler is at least one member of the group consisting of

| | |
|---|---|
| Ethylene glycol monomethyl ether | Methanol |
| Ethylene glycol monoethyl ether | Ethanol |
| Ethylene glycol monobutyl ether | Isopropanol |
| Ethylene glycol ethylbutyl ether | Butanol |
| Ethylene glycol monophenyl ether | Amyl alcohol |
| Ethylene glycol monobenzyl ether | Iso decanol |
| Diethylene glycol monomethyl ether | Undecanol |
| Diethylene glycol monoethyl ether | Diacetone alcohol |
| Diethylene glycol monobutyl ether | Hexanol. |

5. A method in accordance with claim 2 in which said mineral thinner is an aliphatic mineral fraction having a boiling range falling between approximately 100° to 500° F.

6. A method in accordance with claim 2 in which said mineral thinner is an aromatic mineral fraction having a boiling range falling between approximately 100° to 500° F.

References Cited

UNITED STATES PATENTS

| | | | |
|---|---|---|---|
| 2,340,940 | 2/1944 | De Forest | 73—51 |
| 2,667,070 | 1/1954 | Sockman et al. | 73—104 |
| 3,028,338 | 4/1962 | Parker | 73—104 |
| 3,279,243 | 10/1966 | Molina | 73—104 |

FOREIGN PATENTS 709,101   5/1954   Great Britain.

RICHARD C. QUEISSER, *Primary Examiner.*

C. I. McCLELLAND, *Assistant Examiner.*

U.S. Cl. X.R.

252—408